US010571212B1

United States Patent
Rivera Marchand et al.

(10) Patent No.: US 10,571,212 B1
(45) Date of Patent: Feb. 25, 2020

(54) LODGED PROJECTILE REMOVAL CHARGE

(71) Applicant: The United States of America as Represented by the Secretary of the Navy, Indian Head, MD (US)

(72) Inventors: David Rivera Marchand, Alexandria, VA (US); Angel Diaz, Indian Head, MD (US); Daniel McCarthy, LaPlata, MD (US); Michael G. Craft, Waldorf, MD (US); Walter Hubbard, LaPlata, MD (US); Nicholas Shaker, Springfield, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/350,088

(22) Filed: Sep. 25, 2018

(51) Int. Cl.
| | |
|---|---|
| *F42B 33/00* | (2006.01) |
| *F41A 29/00* | (2006.01) |
| *F41F 3/058* | (2006.01) |
| *F42B 1/02* | (2006.01) |
| *B08B 7/00* | (2006.01) |
| *F42D 3/00* | (2006.01) |
| *B33Y 80/00* | (2015.01) |

(52) U.S. Cl.
CPC ............ *F41A 29/00* (2013.01); *B08B 7/0007* (2013.01); *F41F 3/058* (2013.01); *F42B 1/02* (2013.01); *F42D 3/00* (2013.01); *B33Y 80/00* (2014.12)

(58) Field of Classification Search
CPC ........ F41A 15/22; F41A 21/485; F41A 29/00; F42B 1/028; F42B 1/032; F42B 1/02; F42B 33/06

USPC ................................ 102/442; 86/50; 89/1.13
See application file for complete search history.

(56) References Cited

U.S. PATENT DOCUMENTS 4,062,112 A * 12/1977 Lake .................... B23D 15/145
30/228
4,779,511 A * 10/1988 Proctor ................... F42B 33/06
86/50

(Continued)

OTHER PUBLICATIONS www.liberatedmanuals.com/TM-9-1025-211-10.pdf Operator's Manual For Howitzer, Medium, Self-Propelled, 155MM 4-24. (see p. 377) Operation of Extractor Tool Assembly For Projectiles M712 and M823 a. General. The extractor assembly is used to remove the M712 or M823 projectile from the weapon.

(Continued)

*Primary Examiner* — Michael D David
(74) *Attorney, Agent, or Firm* — Fredric Zimmerman

(57) ABSTRACT

A process that uses a lodged projectile removal charge (LPRC) apparatus to remove a projectile jammed in a cannon's gun tube. The LPRC is positioned coaxially and offset from the projectile, and the gun tube is filled with water. The charge is detonated producing a shock wave that disintegrates the LPRC apparatus and pressurizes the water. The pressurized water produces a radial hydraulic force against an interior wall of the gun tube, an axial hydraulic force against the projectile pushing the projectile toward the chamber, and produces an opposing expansion of explosive gases that blasts out most of the water in the gun tube. The process is less likely to damage the gun tube. The LPRC may be made using a 3D printer.

22 Claims, 6 Drawing Sheets

(56) References Cited

U.S. PATENT DOCUMENTS

| | | | | |
|---|---|---|---|---|
| 8,276,495 | B1* | 10/2012 | Chiu | F41A 21/485 |
| | | | | 42/1.08 |
| 9,482,499 | B1* | 11/2016 | Gotzmer | F42B 1/032 |
| 10,337,814 | B1* | 7/2019 | Shaker | F41A 15/22 |
| 2005/0081706 | A1* | 4/2005 | Alford | F42B 33/062 |
| | | | | 89/1.13 |

OTHER PUBLICATIONS www.dtic.mil/dtic/tr/fulltext/u2/a134349.pdf Field Artillery Cannon Weapons Systems and Ammunition Handbook. (see p. 99) (3) Sticker. A sticker is a projectile that is lodged in the tube after the weapon has been fired. Stickers result from insufficient chamber pressure.

* cited by examiner

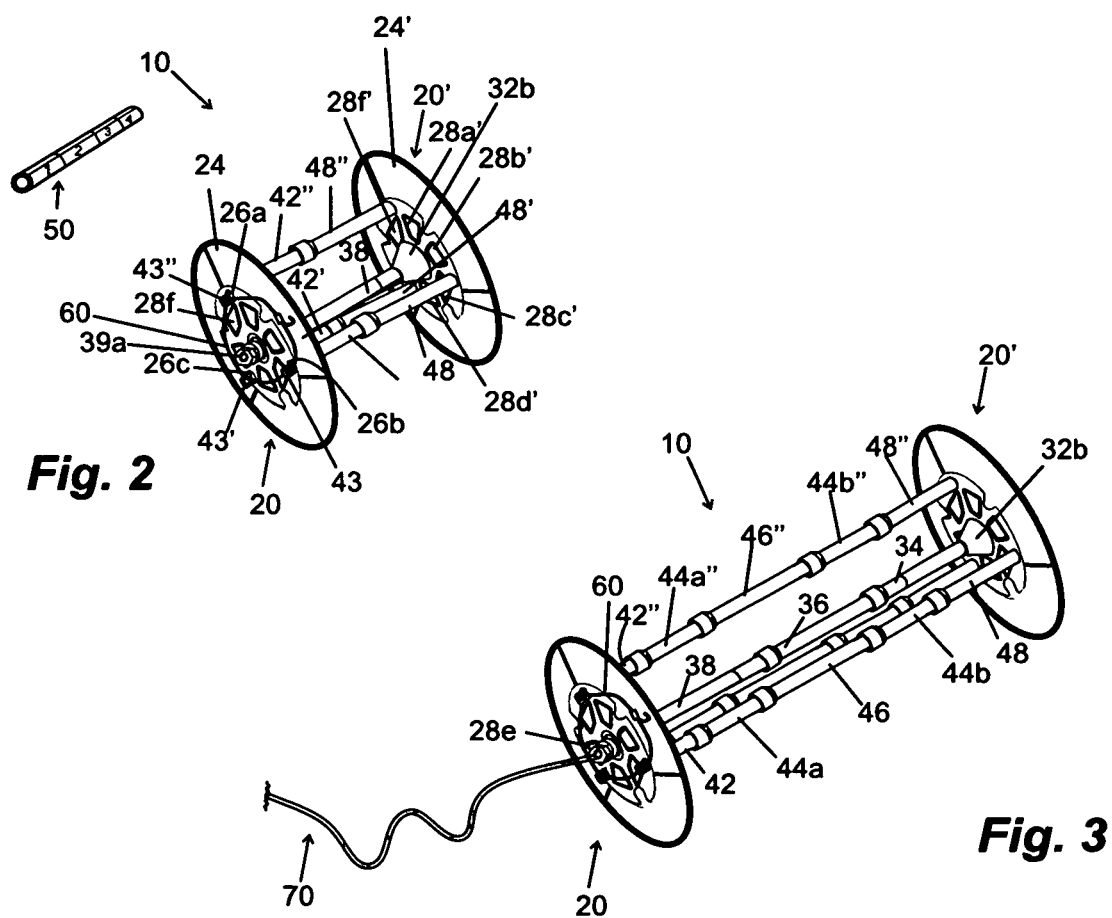

| Position in barrel (inches) | Charge Type | Void | Tube Diameter (inches) | Tube length +2 (inches) |
|---|---|---|---|---|
| 6 | DET Cord 200 gpf | water | 1/4, 5/16 | 4,8,12 |
| 6 | DET Cord 100 gpf | water | 5/16 | 18 |
| 6 | DET Cord 500 gpf | water | 1/2 | 18 |
| 6 | DET Cord 50 gpf | water | 1/2 | 18 |
| 6 | C4 | water | 1/4 | 4,8,12,18 |

*Fig. 5*

```
┌─────────────────────────────────────────────────────────┐
│ opening the breechblock and cleaning the chamber        │
│ after determining that the projectile is jammed in the  │
│ gun tube and enough time has elapsed for the gun        │
│ tube to cool and noxious gases have dissipated.         │
└─────────────────────────────────────────────────────────┘
                            │
                            ▼
┌─────────────────────────────────────────────────────────┐
│      setting up a projectile catching means, which      │
│             typically employs sandbags.                 │
└─────────────────────────────────────────────────────────┘
                            │
                            ▼
┌─────────────────────────────────────────────────────────┐
│ confirming the position of the projectile from the      │
│ chamber visually.                                       │
└─────────────────────────────────────────────────────────┘
                            │
                            ▼
┌─────────────────────────────────────────────────────────┐
│ completing the assembly of a lodged projectile          │
│ removal charge (LPRC) apparatus and charge.             │
└─────────────────────────────────────────────────────────┘
                            │
                            ▼
┌─────────────────────────────────────────────────────────┐
│ sliding the LPRC apparatus down the gun tube to an      │
│ offset position and tying the supporting line off, where│
│ the offset position is an optimum distance between a    │
│ forward end of the projectile and a rearward end of     │
│ the energetic material, wherein the energetic material  │
│ is centrally aligned with an axis of a bore of the gun  │
│ tube.                                                   │
└─────────────────────────────────────────────────────────┘
                            │
                            ▼
┌─────────────────────────────────────────────────────────┐
│ filling a void between the projectile and a rim of the  │
│ gun tube with water.                                    │
└─────────────────────────────────────────────────────────┘
```

*Fig. 6a* detonating the energetic material which produces a shock wave that disintegrates the LPRC apparatus and pressurizes the water, wherein the pressurized water produces a radial hydraulic force against an interior wall of the gun tube, an axial hydraulic force against the projectile pushing the projectile toward the chamber, and produces an opposing expansion of explosive gases that blasts out most of the water in the gun tube

inspecting the catching means to confirm that the projectile is dislodged or that the projectile is still jammed in the gun tube, and therefore that another nudge using the LPRC apparatus having a potentially higher charge load is required

*Fig. 6b*

LODGED PROJECTILE REMOVAL CHARGE

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The invention relates generally to a process and an apparatus for removing projectiles that are lodged in a cannon's barrel (cannon tube), and more particularly wherein removal is less likely to damage the cannon tube such that the cannon is removed from service.

2. Background

In the invention the cannon is typically a howitzer, and more specifically a 155 mm howitzer, such as the M198 howitzer, which is a medium-sized, towed 155 mm artillery piece, developed for service with the United States Army and Marine Corps. The M198 was a replacement for the M114 155 mm howitzer, and it went into full production in 1978. The M198 is being replaced by the M777 howitzer. Another example of the howitzer is the M109, which is self-propelled.

A projectile that remains lodged in the cannon tube after normal functioning of the ignition train is historically called a sticker. When a sticker occurs, gases under high pressure are retained in chamber, and the recoil mechanism (hydro-pneumatic system on M114) may still be coiled. The sticker creates a very dangerous situation, and if available, the howitzer must be serviced by EOD personnel before (if ever) it can be used again.

Typically, after being isolated and kept dry for a period to allow the ignition train charge gases to escape and the cannon to cool, the breech is opened and the chamber is carefully and thoroughly emptied of any wadding and/or remaining charges. The jammed projectile is normally removed using an extractor. For example, the base of the M712 projectile is designed to be coupled to the extractor so that the projectile may be removed from the gun tube.

The extractor is a telescoping rod having a front end connector, a brace that spans the breech, an alignment support, and a rear end having a ratcheted device, wherein the front end connector connects to the base of the M712 projectile. As the ratchet is turned, the lodged projectile is pulled rearward toward the chamber, wherein ultimately it may be received into a manned sling. Particularly in cases where the jammed projectile is cocked, the extraction can damage the gun tube, rendering the gun tube so damaged as to be unusable, therein requiring a total replacement of the gun tube, which costs millions of dollars.

SUMMARY OF THE INVENTION

A first object of the invention is to provide a process for removing a projectile lodged in a gun tube of a cannon, wherein the process is less likely to damage the gun tube.

A second object of the invention is to provide a process which is suitable for being implemented in the field.

A third object of the invention is to provide a lodged projectile removal charge (LPRC) apparatus, wherein the LPRC apparatus disintegrates on detonation and has no residual elements that are hard enough to damage the gun tube.

A fourth object of the invention is to provide a LPRC apparatus that can be easily adapted to accommodate a wide range of explosive charge dimensions and strengths.

A fifth object of the invention is that the LPRC apparatus can be formed in the field using a 3D printer.

BRIEF DESCRIPTION OF THE DRAWINGS

The foregoing invention will become readily apparent by referring to the following detailed description and the appended drawings in which:

FIG. 2 is a perspective view of a shortest LPRC apparatus for a six inch gun tube;

FIG. 3 is a perspective view of a longest LPRC apparatus for a six inch gun tube;

FIG. 5 is a table for a six inch barrel listing a range of explosive charge types, dimensions and strengths; and FIG. 6a and FIG. 6b describe the process for removing a projectile lodged in a gun tube utilizing the LPRC apparatus.

DETAILED DESCRIPTION OF THE INVENTION

The invention is a process that uses a lodged projectile removal charge (LPRC) apparatus to remove a projectile jammed in a cannon's gun tube. The LPRC is positioned coaxially and offset about eighteen inches from the projectile, and the gun tube is filled with water. When the charge is detonated it produces a shock wave that disintegrates the LPRC apparatus and pressurizes the water added to the gun tube. The pressurized water produces a radial hydraulic force against an interior wall of the gun tube, an axial hydraulic force against the projectile pushing the projectile toward the chamber, and produces an opposing expansion of explosive gases that blasts out most of the water in the gun tube.

The process is much less likely to damage the gun tube than are explosive systems used to demolish ordnance, (e.g. the unexploded jammed projectile).

The LPRC may be made using a 3D printer. Exemplary plastics are ABS and PLA, and an exemplary energetic material is DET Cord. C4 also may be suitable, but as will become evident the charge is substantially linear, and DET Cord is a linear charge.

Figure 1:
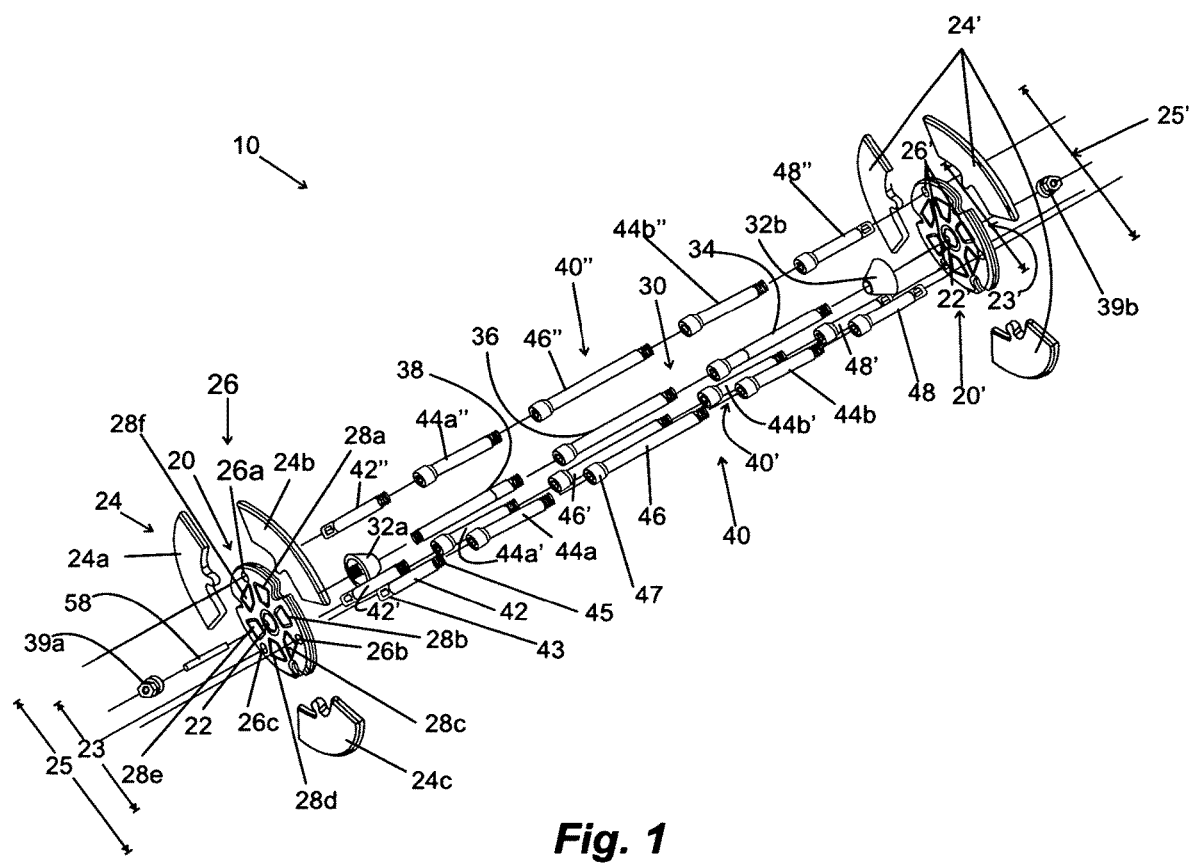
FIG. 1 is an exploded view of the LPRC apparatus illustrating all the elements, wherein one possible assembly using all the elements that are shown.

As shown in FIG. 1, FIG. 2 and FIG. 3 the LPRC apparatus may be assembled for a specific charge size and dimensions, and can be adjusted for gun tubes of various bore diameters. A 155 mm diameter bore is 6.10 inches, just slightly larger than six inches, so a LPRC apparatus having a six inch diameter spacer discs will fit in a 155 mm bore, and a dry charge tube aligned with six inch spacer discs is in axial alignment with the gun tube. The final diameter of the pair of perforated spacer discs is about 97.0%±about 2.9% of the bore diameter of the gun tube.

In FIG. 1 the LPRC apparatus 10 includes a pair of perforated spacer discs 20,20', wherein each perforated spacer disc has a center axial hole 22,22', a set of peripheral holes 26,26', a diameter 23,23' and, optionally, a set of peripheral interlocking concentric sectional elements 24,24' that when connected increase the diameter of the perforated spacer disc to a final diameter 25,25' that closely matches a bore diameter of the gun tube. There are three sets of the sectional lengths of support rods 40,40',40", at least one sectional length of a dry charge tube 30 having opposing ends that are mounted through the center axial hole 22,22' of the pair of perforated spacer discs 20,20'. Each disc has a plurality of perforations 28,28', six per disc are illustrated 28a,28b,28c,28d,28e, 28f, that allow water and gases to freely flow past the LPRC apparatus 10 at relatively moderate flow speeds, but when detonated the generated shock wave disintegrates the LPRC apparatus 10, and the plurality of perforations 28,28' will have substantially no effect on flow, as the perforated spacer discs are disintegrated.

The apparatus 10 is modular, in that it may be broken down into small components that can be packed in a small space, and modular in the sense that it can be increased in length incrementally by adding sectional lengths of support rods and sectional lengths of the dry charge tube at several diameters. Exemplary parameters of tested versions are given in FIG. 5 for a 155 howitzer.

As shown in FIG. 2, in one variation of the LPRC apparatus 10, there is one sectional length of a dry charge tube suitable for a four inch charge 50, and it is tube 38, as it is the only tube where both ends are threaded and it is long enough. The sectional lengths of support rods are 42 and 48 from set 40, 42' and 48' from set 40', and 42" and 48" from set 40". These support rods are short enough and have eyelets on both ends. As shown in FIG. 2 the eyelets extend through peripheral holes 26a,26b,26c of disc 20, and a cable tie 60 secures the support rods. Other fastening means are suitable, but the fastening means should not be metallic, as metal could damage the gun tube.

FIG. 3 illustrates an assembled embodiment wherein the charge (not shown) is about eighteen inches long. The overall length of the LPRC apparatus is about 20 inches. At least one sectional length of dry charge tube 30 is just slightly longer than the charge, and it includes a threaded telescoping dry charge tube 36, a threaded and socket telescoping dry charge tube 34, a threaded and socket dry charge six inch tube 38, a pair of threaded conical mounts 32a,32b and a pair of sealing fastening nuts 39a,39b, bringing the overall length to about twenty inches.

The set of sectional lengths of support rods 40 includes a short rod 42 with a threaded end 45 and an eyelet end 43, second short rod 48 having an eyelet end and a socket 47. There is a pair of longer support rods 44a,44b having a threaded end and a socket, and a longest rod 46 with a threaded end and a socket. The eyelets on support rods 42 and 48 of set 40, support rods 42' and 48' of set 40', and support rods 42" and 48" of set 40" attach to the spacer discs 20, 20' through the set of peripheral holes 26,26'. As shown and individually numbered on disc 20 there are three peripheral holes 26a,26b,26c in set 20. The opposing set 20' also has three peripheral holes. The support rods on sets 40,40', and 40" differ only in their position.

Figure 4:
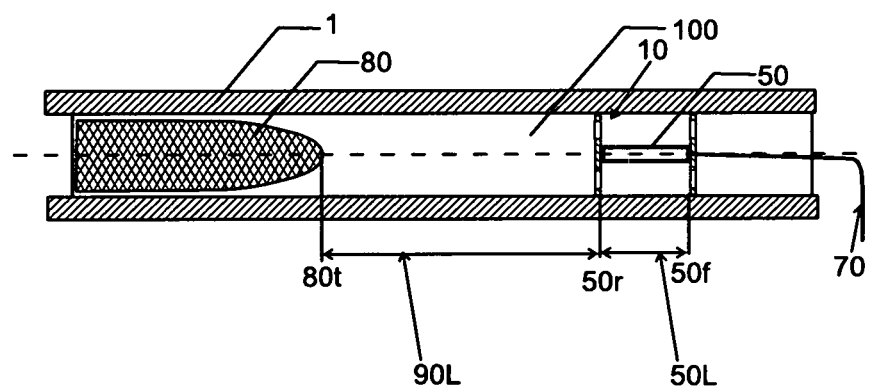
FIG. 4 is side diagrammatic cross-sectional view illustrating a section of the gun tube with a jammed projectile that is filled with water, wherein the charge carried by the LPRC apparatus is positioned axially aligned within the gun tube and a rearward end of the charge is offset about eighteen inches forward of the front of the jammed projectile.

FIG. 4 also illustrates an actuating means with a supporting line, which as shown is a fuse lead 70 for the blasting cap 58 shown in FIG. 1. The fuse lead 70 is used to initiate the blasting cap, and is strong enough to also function as a support line for positioning the LPRC apparatus.

As shown in FIG. 2, the spacer discs 20,20' have been fitted with a set of peripheral interlocking concentric sectional elements 24,24' that when connected increase the diameter 23,23' of the perforated spacer discs 20,20' to a final diameter 25,25' (FIG. 1).

In FIG. 4 a section of the gun tube 1 has a lodged projectile 80 with a forward tip 80t. A charge 50 that axially aligned in the gun tube 1 is contained within the LPRC apparatus 10, and the charge is axially with the projectile. A rearward end of the charge 50r is closest to the tip 80t of the projectile 80. A forward end of the charge is numbered 50f. The charge length 50L is from about four inches to eighteen inches. In the illustrated exemplary embodiment, the length is less than eighteen inches. The diameter of the charge is from about one fourth of an inch to about one half of an inch. The rearward end 50r of the charge 50 is offset an optimum distance 90L between the forward end of the projectile and a rearward end of the energetic material. The optimum distance 90L is about eighteen inches 90L for a 155 mm gun tube. The gun tube 1 is filled with water 100. In the case of most large cannons, the barrel is normally angled upright at least thirty degrees, and more commonly greater than forty five degrees, so there is no problem retaining the water, and the LPRC apparatus 10 can be dropped down the gun tube and tied off at the optimum distance 90L between the forward end of the projectile and a rearward end of the energetic material. Potentially the fuse lead 70 could be used to tie off the LPRC apparatus 10 could be used to position the charge at the optimum distance 90L.

Note, the optimum offset distance 90L remains the same, whether the charge is four inches long or eighteen inches long, the optimum offset distance 90L does not change if the diameter of the charge is one fourth of an inch to about one half of an inch, and does not change if the charge is DET Cord or C4. For example, eighteen inches of 500 gpf would have 750 grains, while eighteen inches of 50 gpf would have only 75 grains. The optimum distance 90L remains the same, which is about eighteen inches 90L for a 155 mm gun tube.

FIG. 5 contains a table for a six inch barrel listing a range of explosive charge types, dimensions and strengths.

The process, as outlined in FIG. 6a and FIG. 6b, for removing a projectile jammed in a gun tube of a cannon having a breech block and a chamber, includes:

opening the breechblock and cleaning the chamber after determining that the projectile is jammed in the gun tube and enough time has elapsed for the gun tube to cool and noxious gases to have dissipated;

setting up a projectile catching means, which generally employs sandbags;

confirming the position of the projectile from the chamber visually;

completing the assembly of the LPRC apparatus as previously described selecting a charge, wherein the charge is contained in the at least one dry sectional length charge tube, a blasting cap and an actuating means with a supporting line;

sliding the LPRC apparatus down the gun tube to an offset position and tying the supporting line off, where the offset position is an optimum distance between a forward end of the projectile and a rearward end of the energetic material, wherein the energetic material is centrally aligned with an axis of a bore of the gun tube;

filling a void between the projectile and a rim of the gun tube with water;

detonating the energetic material which produces a shock wave that disintegrates the LPRC apparatus and pressurizes the water, wherein the pressurized water produces a radial hydraulic force against an interior wall of the gun tube, an axial hydraulic force against the projectile pushing the projectile toward the chamber, and produces an opposing expansion of explosive gases that blasts out most of the water in the gun tube; and inspecting the catching means to confirm that the projectile is dislodged or that the projectile is still jammed in the gun tube, and therefore that another nudge using the LPRC apparatus having a potentially higher charge load is required.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A process for removing a projectile jammed in a gun tube of a cannon having a breechblock and a chamber, comprising:

opening the breechblock and cleaning the chamber after determining that the projectile is jammed in the gun tube and enough time has elapsed for the gun tube to cool and noxious gases have dissipated;

setting up a projectile catching structure, which employs sandbags;

confirming a first position of the projectile from the chamber visually;

completing the assembly of a lodged projectile removal charge (LPRC) apparatus, wherein the apparatus is comprised of a pair of opposing perforated spacer discs, wherein each perforated spacer disc includes a center axial hole, a set of peripheral holes, and diameter, wherein the apparatus includes a set of support rods that attach to the spacer disc through the set of peripheral holes, wherein the apparatus includes at least one sectional length of dry charge tube having opposing ends that are mounted through the center axial hole of each perforated spacer disc, wherein the apparatus includes a quantity of energetic material that comprises a charge, and wherein the charge is contained in the at least one dry sectional length charge tube, a blasting cap and an actuating structure with a supporting line;

sliding the LPRC apparatus down the gun tube to an offset position and tying the supporting line off, where the offset position is an optimum distance between a forward end of the projectile and a rearward end of the energetic material, wherein the energetic material is centrally aligned with the axis of the bore of the gun tube;

filling a void between the projectile and a rim of the gun tube with water;

detonating the energetic material producing a shock wave that disintegrates the LPRC apparatus and pressurizes the water, wherein the pressurized water produces a radial hydraulic force against an interior wall of the gun tube, an axial hydraulic force against the projectile pushing the projectile toward the chamber, and produces an opposing expansion of explosive gases that blasts out most of the water in the gun tube; and inspecting the catching structure to confirm that the projectile is one of dislodged and the projectile is still jammed in the gun tube, and therefore that another nudge using the LPRC apparatus having a potentially higher charge load is required wherein the apparatus is modular, and increasable in length incrementally by adding sectional lengths of support rods and at least one sectional length of the dry charge tube at several diameters.

2. The process according to claim 1, wherein the energetic material is a detonation cord selected from fifty grains per foot to five hundred grains per foot, and wherein the detonation cord has a length of about four to eighteen inches.

3. The process according to claim 1, wherein the at least one sectional length of dry charge tube is comprised of sectional lengths of tube that are connectable into a length of one of about four inches, about eight inches, about twelve inches, and about eighteen inches, wherein the sectional lengths have an overall length that is about two more inches longer for mounting the blasting cap, and wherein the pair of perforated spacer discs with the final diameter keeps the charge axially aligned with the axis of the gun tube.

4. The process according to claim 1, wherein the at least one sectional length of dry charge tube includes an inside diameter from about one fourth of an inch to about one half of an inch.

5. The process according to claim 1, wherein the final diameter of the pair of perforated spacer discs is about 97.0%±about 2.9% of the bore diameter of the gun tube.

6. The process according to claim 1, wherein the optimum distance from the forward end of the projectile to a rearward end of the charge is about eighteen inches.

7. The process according to claim 1, wherein the energetic material is C4.

8. The process according to claim 1, wherein the set of support rods for the LPRC have a combined sectional length selected from the group consisting of one of four inches, about eight inches, about twelve inches, and about eighteen inches, wherein the set of supporting rods have an overall length that is the combined sectional length plus an additional about two more inches, and wherein the set of support rods provide strength for the pair of perforated spacer discs.

9. The process according to claim 8, wherein the combined sectional length of the set of support rods is selected from at least one of a short floodable support rod with a threaded end and an eyelet end, a short floodable support rod with a threaded socket end and an eyelet end, two longer rods with a threaded socket end and a threaded end, one longest floodable support rod with threaded socket end and a threaded end.

10. The process according to claim 5, wherein each perforated spacer disc with the final diameter includes three to four holes for attaching the set of support rods, and wherein said each perforated spacer disc includes a plurality of openings to minimize any restriction of water flow past the perforated spacer disc.

11. An apparatus used to dislodge a projectile jammed in a gun tube of a cannon, comprising: a pair of perforated spacer discs, wherein each perforated spacer disc includes at least a center axial hole, and a diameter; a set of sectional lengths of support rods for attaching to the spacer disc through a set of peripheral holes; and at least one sectional length of a dry charge tube having opposing ends that are mounted through the center axial hole of each of the pair of perforated spacer discs, wherein the apparatus is modular, and increasable in length incrementally by adding sectional lengths of support rods and sectional lengths of the dry charge tube at several diameters, and wherein the apparatus is capable of being disintegrated upon detonation.

12. The apparatus according to claim 11, further comprising:
a quantity of energetic material filling the at least one sectional length of the dry charge tube forming a linear charge; a blasting cap; and an ignition structure including a supporting line.

13. The apparatus according to claim 12, wherein the linear charge is a detonation cord, wherein the detonation cord includes a range of fifty grains per foot to five hundred grains per foot, and wherein the detonation cord includes a length of about four to eighteen inches.

14. The apparatus according to claim 11, wherein the at least one sectional length of the dry charge tube is comprised of sectional lengths of tube are connectable into a combined length selected from one of about four inches, about eight inches, about twelve inches, and about eighteen inches, wherein the sectional length includes an overall length that is about another two inches longer than the combined length for mounting the blasting cap and the pair of perforated spacer discs with the final diameter, and wherein the linear charge is axially aligned with the axis of the gun tube.

15. The process according to claim 11, wherein the at least one sectional length of dry charge tube has an inside diameter from about one fourth of an inch to about one half of an inch.

16. The apparatus according to claim 11, wherein the final diameter of the pair of perforated spacer discs is about 97.0%±about 2.9% of the bore diameter of the gun tube.

17. The apparatus according to claim 12, wherein the energetic material is C4.

18. The apparatus according to claim 11, wherein the set of support rods for the apparatus has a combined sectional length selected from about four inches, about eight inches, about twelve inches, and about eighteen inches, and wherein overall length of the support rods is the combined sectional length of the rods plus an additional about two more inches, and wherein the set of support rods provide strength for the pair of perforated spacer discs.

19. The apparatus according to claim 18, wherein the combined sectional length of the set of support rods is selected from at least one of a short floodable support rod with a threaded end and an eyelet end, a short floodable support rod with a threaded socket end and an eyelet end, two longer rods with a threaded socket end and a threaded end, and one longest floodable support rod with a threaded socket end and a threaded end.

20. The apparatus according to claim 11, wherein each perforated spacer disc with the final diameter includes three to four holes to attach the set of support rods, and wherein said each perforated spacer disc includes a plurality of openings to minimize any restriction of water flow past the perforated spacer disc.

21. The process according to claim 1, wherein said each perforated spacer disc includes a set of peripheral interlocking concentric sectional elements that when attached increase the diameter of each perforated spacer disc to a final diameter that closely matches a bore diameter of the gun tube.

22. The apparatus according to claim 11, wherein said each perforated spacer disc includes a set of peripheral interlocking concentric sectional elements that when connected increase the diameter of the perforated spacer disc to a final diameter that closely matches a bore diameter of a gun tube.

* * * * *